Jan. 4, 1966     O. E. MEYER, SR., ETAL     3,227,855
METHODS AND APPARATUS FOR ELECTRICALLY
PIERCING MICROSCOPIC HOLES
IN DIELECTRIC MATERIALS

Filed Nov. 19, 1962     3 Sheets-Sheet 1

INVENTORS
OTTO E. MEYER, SR.
DONALD R. MEYER
BY
*Steward & Steward*
their ATTORNEYS.

Jan. 4, 1966  O. E. MEYER, SR., ETAL  3,227,855
METHODS AND APPARATUS FOR ELECTRICALLY
PIERCING MICROSCOPIC HOLES
IN DIELECTRIC MATERIALS
Filed Nov. 19, 1962  3 Sheets-Sheet 2

INVENTORS
OTTO E. MEYER, SR.
DONALD R. MEYER
BY
Steward & Steward
their ATTORNEYS.

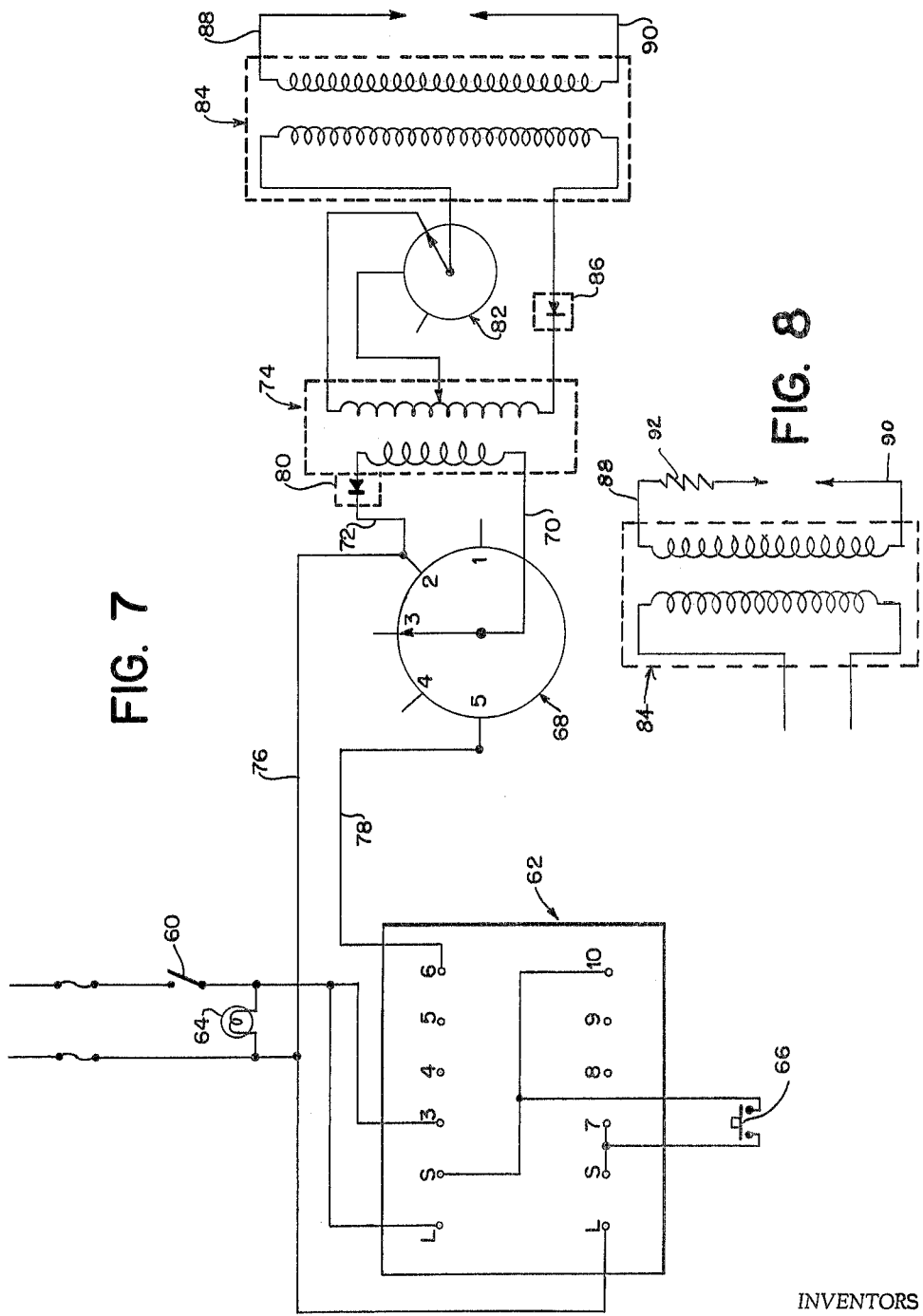

3,227,855
METHODS AND APPARATUS FOR ELECTRICALLY
  PIERCING MICROSCOPIC HOLES IN DIELEC-
  TRIC MATERIALS
Otto E. Meyer, Sr., and Donald R. Meyer, North Haven,
  Conn., assignors to Meyer Laboratories, Inc., North
  Haven, Conn., a corporation of Connecticut
       Filed Nov. 19, 1962, Ser. No. 238,473
           12 Claims. (Cl. 219—384)

This invention relates to methods and apparatus for electrically piercing microscopic holes in dielectric materials, and it relates more particularly to novel methods and apparatus for piercing optical contact lenses in order to form one or more holes through the lens for the purpose of ventilating the surface of the eye beneath the contact lens.

The provision of very small pores or holes at selected points in contact lenses has been attempted heretofore with limited success as a technique for overcoming physiological problems encountered in correcting deficiencies in sight by means of lenses which contact the cornea of the eye. Some of the clinical purposes in perforating such lenses are: (1) to avoid mechanical corneal irritation by allowing the practitioner to fit lenses with less movement during use than might otherwise be required; (2) to achieve substantial ventilation of the cornea; (3) to make possible large optical zones in the lenses when desired; (4) to allow the use of larger lens diameters when desired; (5) to increase the stability of the lens; (6) to provide adequate relief in fitting cosmetic lenses; (7) to make possible use of contact lenses in cases where the corneas are irregular, such as Keratocanus or where irregular astigmation is present resulting in blocking of fluid; (8) to relieve physiological problems produced by the thickness of the lens; (9) to increase the possible wearing time of the lenses; and (10) to maintain corneal-lens relationship in therapeutic use of contact lenses.

Perforations are desirable in contact lenses in order to provide adequate lacrimal flow in the retro-lens space so that gaseous materials may be transmitted through the lens and heat dissipated. In addition, such perforations eliminate microscopic air bubbles behind the lens and provide a more adequate supply of oxygen to the areas of the cornea under the lens.

Methods have been devised for forming microscopic holes in contact lenses. For example, extremely fine mechanical drills have been employed. However, these methods have not been entirely satisfatory due to the difficulty of forming holes of suitable quality, especially with respect to the formation of holes without detrimental surface defects either in the walls of the holes or on the surfaces of the lenses surrounding the holes.

Certain criteria have been found to be necessary for high quality perforations or ventilating holes in contact lenses. For example, the hole should be straight; it should be perpendicular to both lens surfaces; the walls of the hole should be as smooth as the surfaces of the lens and should not be discolored; the area surrounding the hole should contain minimal fracture lines or other irregularities and should not be darkened by excessive heat generated during the perforating process; the diameter of the hole should preferably be smaller than 0.10 mm. or 0.0039 inch; and there must be total freedom from even microscopic burrs or protrusions at either surface of the lens due to the formation of such hole.

If these criteria are not closely adhered to, various adverse effects on the wearer of the lens may occur. If the holes are too large or are not disposed with their axes at right angles to the surfaces of the lens, and if protrusions are present around the holes in either surface of the lens, abrasion of the cornea and/or of the eyelid of the subject may cause considerable discomfort. Also where the diameter of the hole is too large, vision may be disturbed by the hole itself or by excess accumulation of fluid on the outer surface of the lens. Moreover, the holes may become clogged if they are not straight or if their walls are not adequately smooth.

From the foregoing it will be apparent that great care must be taken in perforating contact lenses to produce holes which will not result in problems that are more troublesome than those they are intended to overcome.

An object of the present invention is to produce holes or perforations which are of accurately predeterminable size and which may be closely or widely spaced apart at any desired location on the object being perforated.

A particular object of the invention, insofar as its application in contact lenses is concerned, is to produce holes which are perfectly straight and whose axes intersect both surfaces of the lens at right angles to the surface, or in other words, along a line which is normal to the surface of the lens at the point where the hole is located. Another object is to provide means by which the article to be perforated may be quickly and easily moved from one position to another relative to the device which perforates it, so that the holes can be made at the desired locations while ensuring that each hole, regardless of its location, is directed along a line which is normal to the surface where the hole is located.

According to the present invention the article to be perforated, such as a contact lens, is placed between a pair of electrodes which are then brought into engagement with the surface of the article. A predetermined mechanical pressure is applied against the article by the electrodes and then an electrical current is discharged for a given interval of time between the electrodes in order to form a clean hole of desired diameter through the article.

In order to prevent enlargement of the hole or damage to the article, as well as to the electrodes in some instances, it is desirable to lock the electrodes engaging the article against movement into the hole which is formed. Thus, after each electrode is brought into the desired pressure-engagement with the surface of the article, it is fixed relative to the article so that it can not move when the hole is formed by the electrical discharge between the electrodes.

In practice it has been found desirable to perform the electro-piercing operation under a dielectric fluid which ensures that the current travels directly through the article rather than over its surface and permits holes to be pierced in extremely close proximity to each other.

Apparatus embodying the invention includes a workholder for positioning the article or workpiece relative to an electrode, together with means, such as a spring in the electrode-assembly, for urging the electrode and workpiece into engagement with each other under a predetermined force. Means are also provided for fixing the electrode and workpiece against further movement together and for discharging an electrical current through the workpiece for a given time-interval in order to perforate the workpiece.

Two electrodes are desirably arranged vertically of each other with the workpiece between them in the workholder. The upper electrode is first brought into engagement with the workpiece, thus pressing it firmly against its holder. The electrode may be spring-mounted in such a way that when it engages the article it exerts a pressure on the article equal to the strength of the spring. A setscrew or similar locking means is used for fixing the electrode in its holder after it has been brought into pressure-engagement with the workpiece, thereby preventing the electrode from being forced into the hole when it is formed. After the upper electrode is locked in engagement with the workpiece, the lower electrode is brought up into engagement with the underside of the workpiece and also locked in place. In order to form straight holes as small as 0.0039 inch in diameter and smaller, it is essential that the ends of both electrodes be sharply pointed and disposed directly opposite each other.

While in the description of one embodiment of the invention presented hereinafter, specific reference is made to the formation of holes in contact lenses used in optometry, it is believed that the perforating methods and apparatus of the present invention are applicable in the fabrication of other products, such as filters and the like.

In the drawings, which illustrate by way of example one embodiment of the apparatus of the invention:

FIG. 7 is a wiring diagram of the electrical system which furnishes the current to the electrodes for perforating the workpiece; and FIG. 8 is a diagram of a portion of the circuit shown in FIG. 7 in which a modification is incorporated.

Figure 3:
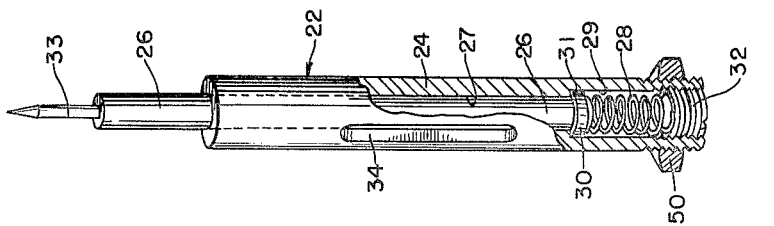
FIG. 3 is a perspective view, partially broken away and in section, of one of the electrode assemblies.

Apparatus embodying the invention as shown in the drawings includes an electrode holder assembly (best shown in FIGS. 1 and 2), which is firmly mounted on a base 10 and comprises a lower horizontal forwardly extending holder arm 12 and an upper holder arm 14 disposed parallel to arm 12 and spaced therefrom by means of a vertical post 16 located adjacent the rear ends of holder arms 12 and 14. Near the front ends (to the right as viewed in FIG. 1) of holder arms 12 and 14 are provided axially aligned, vertical holes 18 and 20, respectively, which receive and hold a pair of oppositely facing, elongated electrode assemblies 22.

As is best shown in FIG. 3, electrode assemblies 22 each consist of an outer sleeve 24 and a sharply pointed electrode 26, which is slidably supported within the bore 27 of sleeve 24 and is resiliently urged toward one end of sleeve 24 by a compression spring 28 located in a slightly enlarged chamber 29 at the opposite end thereof. Spring 28 presses against a head 30 of electrode 26, which fits within chamber 29 and is compressed by an adjusting screw 32 threaded into the outer end of sleeve 24. The head 30 of electrode 26 engages a stop shoulder 31 formed between bore 27 and chamber 29, thus limiting the axial travel of the electrode under the pressure of spring 28. A needle-like tip 33 is desirably separable from the body of electrode 26 so that it can be removed and replaced as its point wears. To this end tips 33 may be press fitted into a socket provided in the end of the body portion of electrode 26.

An elongated slot 34 extends axially of sleeve 24 in one side thereof in order to permit access to electrode 26 by either of two locking screws 36 threaded through the outer ends of each of the holder arms 12 and 14, respectively. Locking screws 36 fix the electrodes 26 in the desired position as will be described hereinafter.

Figure 5:
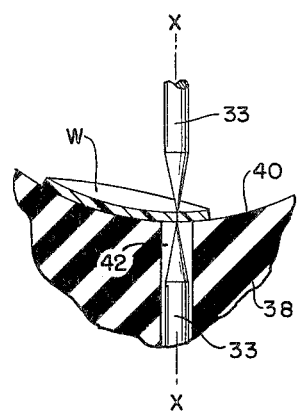
FIG. 5 is a purely schematic drawing on a greatly enlarged scale illustrating how a contact lens is held with respect to the electrodes in order to place the holes in the lens at any desired point on the lens while ensuring that the hole will always be perpendicular to both surfaces of the lens.

A work-holder or lens cup 38 is removably mounted on the upper surface of the lower holder arm 12 at the forward end thereof. Work-holder 38 is a cup-shaped member having a cavity 39 in its upper surface, in which is placed a contact lens W to be perforated. The bottom surface 40 of cavity 39 is desirably a spherical, concave surface, with its radius of curvature substantially equal to that of the convex surface of the lens, and with its center of curvature located on the longitudinal axis X—X of electrodes 26. It will be noted that the lens can be shifted to the desired position between the tips 33 of electrodes 26, in order to form a hole in any desired location in the lens. Moreover, as will be seen in FIGS. 5 and 6, the axis X—X of the electrodes will always be normal to the surfaces of the lens, regardless of the point at which the hole is to be formed. This assures that the hole will be substantially perpendicular to both the inner and outer surfaces of the lens, disregarding of course the slight differences in curvature of the surfaces of the lens.

Figure 4:
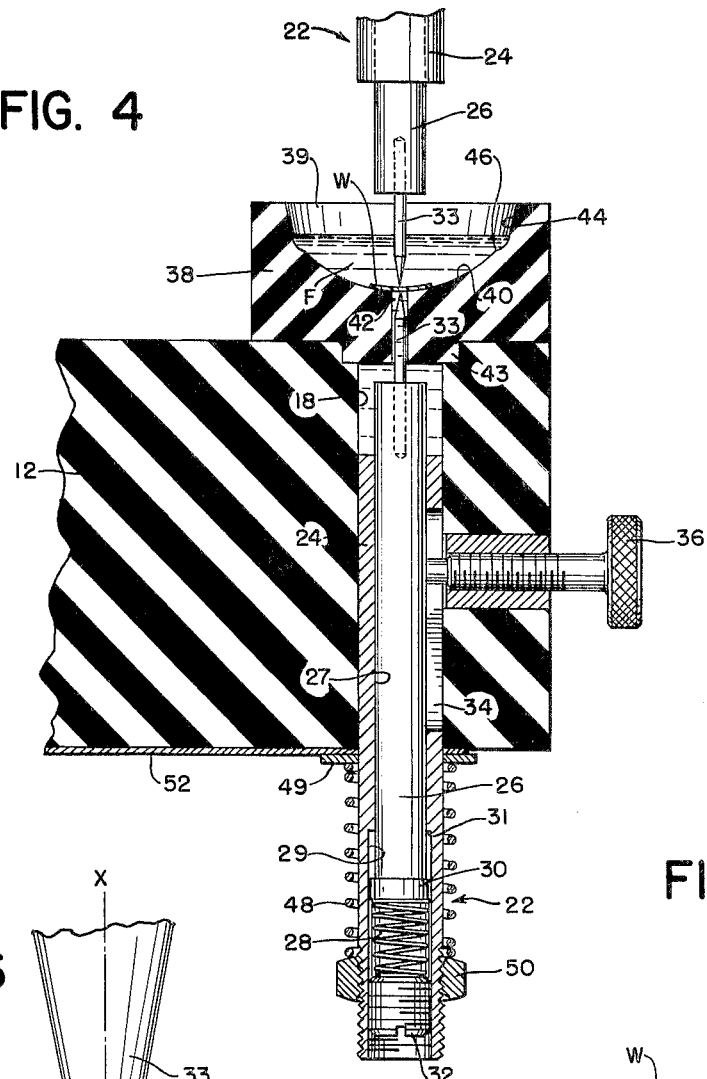
FIG. 4 is an enlarged view in vertical section through the lower holder arm and electrode assembly.

A vertical hole 42 (FIG. 4) is provided in the center of the lens cup 38, through which the conical tip 33 of the lower electrode 26 extends upwardly into engagement with the underside of the lens W. Since the perforation is made under a dielectric fluid F contained in the lens cup 38, it is necessary in order to prevent leakage of the fluid from the cup to have a close-sliding fit between sleeve 24 of electrode assembly 22 and the walls of hole 18 in holder arm 12 and between the electrode 26 and sleeve 24. On the other hand, the tip 33 of the lower electrode 26 fits relatively loosely within the hole 42 so that fluid in the lens holder 38 is permited to flow through the hole 42 around the tip 33, as shown in FIG. 4 for the purpose of insulating the lower electrode. In order to center the lens holder 38 with respect to the axis of electrodes 26, a circular boss 43 is provided on the under surface of holder 38 concentric with the hole 42. When the lens holder is placed in position on the lower holder arm 12, boss 43 is received within a precisely fitting recess in the upper surface of arm 12 concentric with the hole 18 in which the lower electrode assembly 22 is held.

If desired, the bottom surface 40 of cavity 39 in the lens holder may be convex, rather than concave as shown, in which event the lens would be inverted so that its concave surface faces downwardly in order to conform with the curvature of the bottom of cavity 39 in the lens holder. It has been found, however, that in manually positioning the lens in the holder and removing it after the piercing operation is completed, the lens can be more readily handled when the bottom surface 40 is concave as shown in the drawings. In order to further facilitate removal of the lens from the holder 38, the upper walls 44 of cavity 39 may be provided with a curvature different from the bottom surface 40, thereby forming a ridge 46 at the intersection of walls 44 and bottom 40. In order to remove the lens from the cup, it is simply moved across the bottom surface 40 until the edge of the lens projects over the ridge 46 so that the lens may be readily grasped with a pair of tweezers or similar implement.

Figure 1:
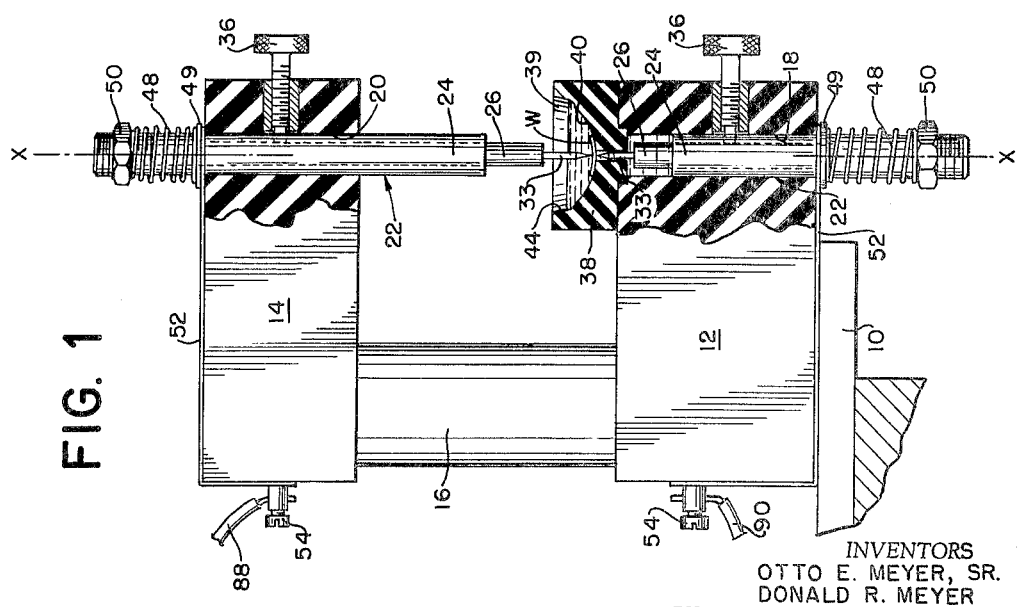
FIG. 1 is a side view, partially broken away and in section, of the electrode holder assembly.

Referring again to the electrode assemblies 22, it will be noted in FIG. 1 that an outer spring 48 encompasses the sleeve 24 of each electrode assembly outwardly of holder arms 12 and 14. A brass or copper washer 49, to which an electrical conductor may be connected for supplying power to the electrode, as disclosed hereinafter, fits around the sleeve 24 of each electrode assembly next to the outer sides of the holder arms. Springs 48 are compressed between washers 49 and nuts 50 threaded on the outer ends of sleeves 24 of the electrode assemblies 22. Springs 48 urge the electrode assemblies 22 outwardly or in opposite directions from each other to their retracted position. When the locking screws 36 are released from rigid engagement with electrodes 26, the outer spring 48 provided on each electrode assembly draws the electrode out of engagement with the workpiece. Such outward movement of the electrode assemblies 22 is limited by screws 36, the ends of which remain within slots 34 in sleeve 24, so that as each of the locking screws is loosened, the electrode automatically retracts to the position shown in FIG. 2. The lens W is then free to be moved in its holder so that another perforation can be made at any other point on the lens or, if all the perforations required have been made, the lens can be removed and cleaned.

It will be noted that the electrode assemblies are normally held in holder arms 12 and 14 where they can be readily moved into contact with a lens in holder 38. Both electrode assemblies are identical except that the upper one is longer so that it can be retracted to a position above the lens holder 38. When it is desired to remove either or both electrodes entirely from the apparatus in order to resharpen or replace its tip 33, locking screws 36 may be backed out far enough so that their ends clear slots 34 in the sleeves 24, thus permitting each electrode assembly 22 to be removed as a unit. The tips 33 can then be easily removed from the shanks 26 and replaced with sharp tips.

Figure 2:
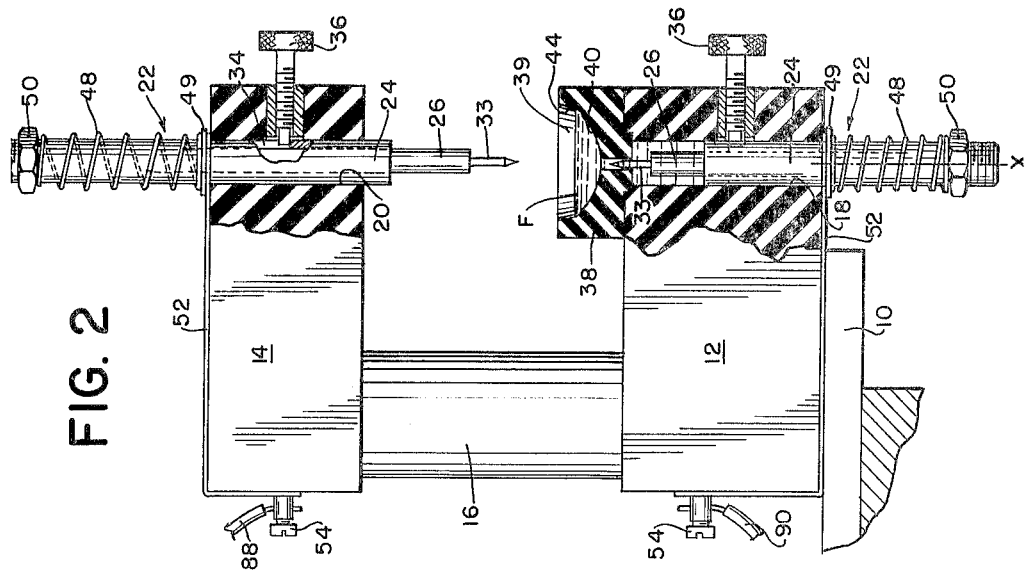
FIG. 2 is a view similar to FIG. 1, but showing the electrodes in position to receive a workpiece in the workholder.

In perforating a contact lens in accordance with the present invention, the electrode assemblies 22 are located in their retracted positions as shown in FIG. 2 with locking screws 36 loosened so that electrodes 26 and sleeves 24 are free to move longitudinally with respect to holder arms 12 and 14. The lens W is then placed on the bottom surface 40 of lens holder 38 so that the tips of the electrodes may be brought into engagement with the lens at the proper point where a perforation is to be made. A sufficient quantity of dielectric fluid F is placed in the cavity 39 of lens holder 38 so that the lens is completely immersed. Fluid F is desirably placed in holder 38 before the lens in order to insure that the fluid flows through the hole 42 to insulate the lower electrode 26. A film of insulating fluid also separates the under surface of the lens from the bottom 40 of the lens holder. The dielectric fluid employed should be one which has a fairly low viscosity and which does not readily break down under extreme temperatures. It has been found that a silicone dielectric fluid produced by General Electric Company identified as XF–1053 is highly satisfactory for this purpose. The viscosity of XF–1053 is 140 cps. at −80° F. and 2 cps. at 400° F. This fluid has a flash point of about 450° F. and a dielectric strength of 32.5 kv. It has sufficient healing power to maintain its dielectric strength after repeated applications of current, thus making it unnecessary to replace the fluid even when a large number of perforations are being made at a time.

The upper electrode 26 is first brought into engagement with the upper surface of the lens by pressing the assembly 22 downwardly against the pressure of retracting spring 48. When the tip 33 of the electrode contacts the surface of the lens, further movement of the electrode 26 itself is arrested, and the desired pressure of the tip 33 against the lens is then obtained by moving sleeve 24 down an additional amount, so that the head 30 of electrode 26 is lifted off its stop shoulder 31 against the pressure of compression spring 28. In this way a predetermined amount of pressure of the electrode 26 can be exerted against the surface of the lens. When the desired pressure of the upper electrode on lens W is obtained, the locking screw 36 is tightened against electrode 26, thereby fixing the latter and its sleeve 24 in place. The pressure of the electrode is therefore maintained against the surface of the lens.

With the upper electrode pressing lens W downwardly against the bottom 40 of lens holder 38, the tip of the lower electrode is brought up through the hole 42 in the bottom of holder 38 into engagement with the under surface of the lens and pressure applied in the same manner that the upper electrode is brought into its working position. In order to ensure that the lens is not lifted off its supporting surface 40, the pressure applied by the lower electrode should be no greater than that exerted by the upper electrode. The pressure of lower electrode 26 on the lens is then maintained by tightening its locking screw 36, and the apparatus is ready for the perforation to be made by impressing a high voltage on the electrodes, causing an electrical discharge between them and through the material of lens W.

Figure 6:
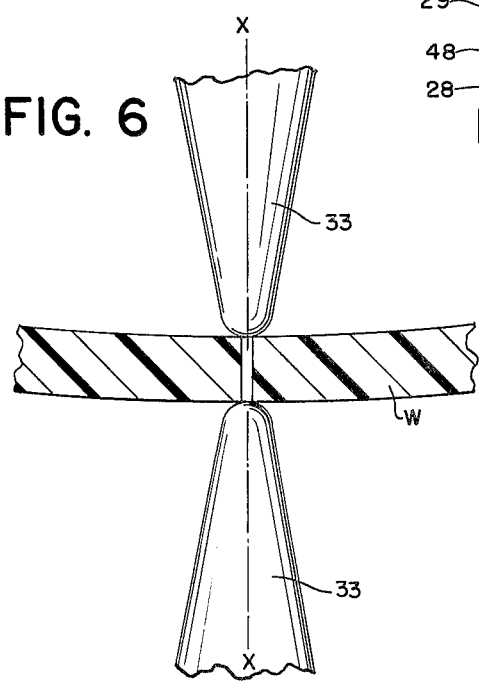
FIG. 6 is another purely schematic view of the tips of the electrodes as they would appear under a microscope just after a hole is formed in the workpiece illustrating the approximate relation of the hole to the electrode tips.

As may be seen in FIG. 6, the tips 33 of electrodes 26 are not forced into the hole formed in the lense by the piercing operation. This is due to the fact that both electrodes are fixed in place by locking screws 36. It will be appreciated that the lens material in the immediate vicinity of the hole formed will become softened somewhat by the electrical discharge and that serious damage to the lens could be caused by the electrodes if they are permitted to continue to exert pressure against the lens while the perforation is actually being made. The electrodes, however, being fixed in their holders 12 and 14 by locking screws 36, are positively prevented from pressing into the surface of the lens, thereby forming a clean right-angle intersection of the hole at each surface of the lens.

When the hole has been formed, the locking screws 36 are loosened to allow the retracting springs 48 of the electrode assemblies 22 to withdraw the assemblies from the lens to the positions shown in FIG. 2. The lens can then be shifted in its holder and one or more additional holes formed in the same manner. An important advantage of the present invention is that it makes possible the placement of holes at extremely close proximity to each other on the workpiece being perforated. For example, it has been found that each hole may be located as close to an adjacent hole as the size of the holes involved. In other words, if the holes being pierced are 0.003 inch in diameter, they can be spaced as close as 0.003 inch to each other by using the perforating technique of the present invention. If need be, smaller holes can be located even closer together. It is believed that this is made possible by the presence of the dielectric fluid in the openings of the existing holes while the new holes are being formed, and by pressure-engagement of the electrodes on opposite surfaces of the material being perforated, thus ensuring that the line of least electrical resistance is a straight line through the material between the points of the electrodes rather than through holes already pierced in the material. It will be appreciated that this is an important advantage, not only in the perforation of contact lenses, but also in other applications, such as in the manufacture of extremely fine filters.

It is important to bear in mind that in order to obtain a hole through the lens which is normal to the curvature of the lens, the sharp points of the electrodes must be directly opposite each other. In other to accomplish this, it is necessary that the points on the tips 33 be accurately machined and that the holes 18 and 20 in holder arms 12 and 14 be perfectly aligned. Furthermore, the sleeves 24, electrodes 26 and tips 33 of the electrode assemblies 22 must be exactly concentric with each other in order to ensure that the points of tips 33 lie precisely on a line normal to the curvature of the lens. In order to avoid any eccentricity of the tips of the electrode, an alignment bar should be placed in the holes 18 and 20 of the electrode holder assembly before the electrodes are assembled in position, and the holder arm 12 and 14 adjusted by suitable means (not shown) until holes 18 and 20 line up perfectly. If any eccentricity is still found to exist, the electrodes 26 may be rotated in their sleeves 24 to bring the points of tips 33 into exact alignment.

Power is furnished to each electrode 26 through suitable conductors 52 connected to the washers 49, against which the retracting springs 48 are compressed. Conductors 52 are run along the outer surfaces of the holder arms 12 and 14, respectively, to terminals 54 located at the back ends of the holder arms.

Referring now to the wiring diagram of FIG. 7, power is supplied from a standard 110-volt, 60-cycle, supply line through a cut-off switch 60 to an electronic timer 62, which may be, for example, a Cramer Type 940. An indicator light 64 is provided in the power supply in order to indicate when the power is on. Suitable connections are made at timer 62 with the power supply in order to select the desired time interval during which power is furnished the electrodes for perforating a workpiece. A push-button switch 66 is provided on the timer for initiating the timing cycle.

A voltage control 68, such as a Powerstat Type 20 or similar unit, is connected by leads 70, 72 across the primary of a first step-up transformer 74. The input to control 68 is provided by a power lead 76 connected to one side of the 110-v. power main and a lead 78 from timer 62. A diode rectifier 80 is placed in one of the primary winding leads for a purpose to be described presently. The secondary of transformer 74 is tapped to provide different output voltages which may be selected by voltage selector 82. The voltage thus selected is fed to the primary of a high-tension transformer 84, and again a diode rectifier 86 is provided in the primary circuit of this second transformer. High voltage output from transformer 84 is supplied through leads 88, 90 to the terminals 54 of the electrode holder assembly.

Diodes 80 and 86 in the primaries of the respective transformers control the type of discharge produced at the electrodes so that shattering of the lens is prevented.

The arrangement of two step-up transformers here disclosed provides certain advantages of flexibility in voltage selection and control, as well as greater availability of transformers suitable for the purpose. A single transformer of proper step-up ratio could, however, be substituted for the arrangement specifically illustrated and described.

With the electrode assemblies 22 in proper engagement with a lense W as hereinbefore described, and with the power supply switch 60 closed, the timer push-button switch 66 is actuated to start the perforating cycle. A high-voltage current of predetermined duration is thus discharged between the tips 33 of the perforating electrodes.

It has been found that the size of the hole produced depends primarily on the current or amperage of the discharge at the electrodes, and within reasonable limits as indicated hereinafter, changes in voltage and in the length of time that the power is applied to the electrodes has little significant effect. Moreover, from tests conducted it appears that small differences in the thickness of the material being perforated do not produce any noticeable change in the size of the aperture. Thus, it is entirely practical, in lenses which do not vary too greatly in thickness, to produce perforations of substantially uniform size without changing the voltage or time interval of the electrical discharge.

Holes produced in accordance with the above-described process form right-angle junctures with both lens surfaces; that is, the surface junctures are free of bevels, blends or other deviations, such as microscopic burrs or protrusions. Moreover, the axis of the hole is normal to the surface of the lens, the inner walls have a high quality finish, and fracture lines surrounding the holes or perforations are minimal.

In the following tables the results obtained in the course of perforating a number of contact lenses under different operating conditions are indicated. These tests were performed on contact lenses of standard optical-quality methyl methacrylate copolymer sold under various trade names such as "Electroglas #2," "HyFrax" and "PMMA." "Electroglas" is a product of Glasflex, Inc., of Sterling, New Jersey, which has a dielectric constant of 2.73 at a current frequency of one megacycle. In each sample tested the electrodes exerted a pressure of approximately ⅛ oz. on the lens surface before the perforation was made.

Table A shows perforation or hole diameter versus electrode voltage, the lens thickness and the time interval of discharge being kept constant. In these examples the lens thickness in each case was 0.25 mm. and the interval of time of the electric discharge was 0.02 second. In this and in all other examples hereinafter mentioned, the XF–1053 dielectric fluid previously mentioned was employed.

*Table A*

| Approx. High Tension Transformer Output Voltage | Diameter of Hole in Inches | |
|---|---|---|
| | Sample 1 | Sample 2 |
| 2,360 | 0.0030 | 0.0035 |
| 4,720 | 0.0036 | 0.0032 |
| 7,090 | 0.0033 | 0.0032 |
| 9,450 | 0.0035 | 0.0031 |
| 11,810 | 0.0032 | 0.0031 |
| 15,090 | 0.0030 | 0.0029 |
| 16,535 | 0.0035 | 0.0035 |
| 18,890 | 0.0031 | 0.0034 |
| 21,275 | 0.0039 | 0.0035 |
| 24,860 | 0.0029 | 0.0033 |
| 26,590 | 0.0033 | 0.0034 |
| 28,335 | 0.0035 | 0.0036 |

The high tension transformer, corresponding to transformer 84 in FIG. 7, used in obtaining these results was energized by 60-cycle alternating current and had a nominal output rating of 15 kv. at 60 milliamperes. The transformer was actually operated at voltages above its nominal rating in some instances, principally for purposes of test. However, the period of operation under overload condition is so short (only a fraction of a second) in each instance that no damage results, although a transformer having an adequately high insulation rating should obviously be employed.

At the extreme lower and upper voltages noted in Table A, the holes produced in the lenses are poor. Incomplete perforation or irregularity in the wall of the hole results at the low voltage end, while burning, flashing and/or cracking of the lens occurred near the upper limit of the voltage range. In between these extremes, however, the results are good, the holes produced being free of cracks, craters, flash-marks or other irregularities. But variation of the voltage at the electrodes, within the range indicated appears to have no significant effect upon the diameter of the hole produced. This is further evidenced in Table B which is a tabulation similar to that in Table A, but in which a different high tension transformer was used, having a nominal rating of 10 kv. at 24.2 milliamperes.

*Table B*

| Approx. high tension transformer output voltage | Diameter of hole in inches |
|---|---|
| 10,635 | 0.0024 |
| 12,980 | 0.0025 |
| 15,350 | 0.0026 |
| 17,715 | 0.0027 |
| 20,100 | 0.0028 |
| 22,450 | 0.0026 |
| 24,800 | 0.0027 |
| 27,200 | 0.0028 |
| 29,550 | 0.0027 |
| 31,900 | Flashed and Burned |

The lenses here had a thickness of 0.22 mm. as against 0.025 mm. in the previous set, but as explained hereinafter this slight difference in thickness is not material. Otherwise the operating conditions were unchanged from those obtaining in Table A and again the results indicate no significant variation in aperture size with change in voltage.

It will be noted, however, that there is a difference in the average size or diameter of the holes between the two groups of lenses reported in Tables A and B, the holes in Table B being substantially smaller than those in Table A. This arises from the fact that in perforating the lenses in Table A, a transformer of higher current capacity was employed. The effect of current on the size of the aperture is further illustrated in Table C where a comparison is made using, in one set of lenses, a current limiting resistor 92 (see FIG. 8) of ten thousand (10K) ohms inserted in the high tension lead to one of the electrodes, and in a second set without the resistor, the lower capacity (10 kv., 24.2 ma.) transformer being used.

Table C

| Lens Sample | Diameter of Hole Produced in Inches | |
|---|---|---|
| | With Current Limiting Resistor | Without Current Limiting Resistor |
| 1 | 0.0018 | 0.0022 |
| 2 | 0.0020 | 0.0023 |
| 3 | 0.0017 | 0.0024 |
| 4 | 0.0018 | Flashed and Burned |

The same voltage (approximately 16,525 volts) was employed throughout this series. The lens thickness was 0.22 mm. and the time interval was again 0.02 second, in all examples.

Other tests have shown that varying the high tension voltage using the current limiting resistor produces no significant change in the diameter of the hole, at least within voltage limits which do not result in burning or cracking at the peripheries of the holes. However, the range of suitable voltages is somewhat narrower in this case than where no resistor is used although the quality or physical characteristics are improved.

The period or length of time during which the perforating voltage is applied to the electrodes is also material to the quality of the hole produced in the lens; i.e., the uniformity, shape, lack of cratering, cracking or burning around the hole, and general smoothness of the bore produced is dependent on the time interval. But again, within the useful limits, variations in the time of current discharge do not appreciably affect the size or diameter of the hole. This is illustrated in Tables D and E at a constant discharge voltage but for transformers of two different current ratings. In Table D, the indicated results were obtained at 16,525 volts using a transformer rated at 60 milliamperes at 15,000 v.; no current limiting resistor was used and the lens samples all were 0.23 mm. thick. Satisfactory holes were produced in time intervals of from around 0.02 up to about 0.40 second. Greater times tended to cause surface irregularities and burning while shorter times did not consistently effect penetration.

Table D

| Lens Sample | Time (seconds) | Diameter (inches) |
|---|---|---|
| 1 | 0.02 | 0.0032 |
| 2 | 0.05 | 0.0031 |
| 3 | 0.10 | 0.0032 |
| 4 | 0.15 | 0.0033 |
| 5 | 0.20 | 0.0036 |
| 6 | 0.25 | 0.0035 |
| 7 | 0.30 | 0.0038 |
| 8 | 0.35 | 0.0030 |
| 9 | 0.40 | 0.0035 |
| 10 | 0.45 | 0.0033 |

Table E

| Lens Sample | Time (seconds) | Diameter (inches) |
|---|---|---|
| Series I: | | |
| 1 | 0.02 | 0.0026. |
| 2 | 0.05 | 0.0027. |
| 3 | 0.10 | 0.0028. |
| 4 | 0.15 | Flashed. |
| 5 | 0.20 | 0.0028. |
| 6 | 0.25 | Flashed and Burned. |
| Series II: | | |
| 7 | 0.02 | 0.0020. |
| 8 | 0.05 | 0.0019. |
| 9 | 0.10 | 0.0024. |
| 10 | 0.15 | Flashed and Burned. |

In Table E, the voltage was also held at 16,525 v. but the transformer was of lower nominal capacity, being rated at 24.2 milliamperes at 10,000 v. In Series I, in this table, the lenses were perforated without using a current limiting resistor; in Series II, a 10K resistor was inserted in series in the electrode circuit. In this case, satisfactory holes were not produced when the time interval exceeded 0.02 second, as burning began to be quite evident beyond this point.

Table F

| Lens Sample | Thickness (mm.) | Diameter (inches) |
|---|---|---|
| Series I: | | |
| 1 | 0.23 | 0.0033 |
| 2 | 0.22 | 0.0034 |
| 3 | 0.20 | 0.0030 |
| 4 | 0.19 | 0.0035 |
| 5 | 0.15 | 0.0033 |
| Series II: | | |
| 6 | 0.26 | 0.0028 |
| 7 | 0.24 | 0.0037 |
| 8 | 0.21 | 0.0030 |
| 9 | 0.19 | 0.0027 |
| 10 | 0.07 | 0.0028 |

The effect on the diameter of the hole where the thickness of the lens is varied is shown in Table F under conditions of constant voltage and time interval. In Series I, "HyFrax" lenses were used having an optical density of 1.53. In Series II, the lenses were "PMMA" type having an optical density of 1.49. Both of these are methyl methacrylate polymers. Thus it appears that thickness of the material within the range normally encountered in opthalmic lenses does not significantly affect the size of the hole produced, nor does moderate change in density of the lens material.

The amount of pressure of the electrodes on the lens prior to discharge of the current which forms the perforations is important. Too light a pressure may result in a hole which is not straight, or it may cause the current to flash along the surface of the lens. On the other hand, too great a pressure of the electrodes on the lens will cause the point of the electrode to penetrate the surface of the lens and distort it by making a depression. As illustrated schematically in FIG. 6, the apex of the point on the tip 33 of the electrode is for practical reasons larger than the diameter of the hole to be perforated. Consequently, if too great a pressure is applied by the electrode, the point will form a depression in the lens surface which is larger than the hole. This forms a beveled intersection of the hole with the lens surface, which is highly undesirable insofar as porous contact lenses are concerned. In such applications, therefore, the pressure of the electrodes on the lens must be carefully chosen. In the examples set forth hereinbefore, about an eighth of an ounce pressure has been found to be satisfactory. Other materials, however, will undoubtedly require different pressure settings.

It has also been found that pre-ionizing the material to be perforated produces improved results in that the holes are of more consistently higher quality. Pre-ionization is accomplished by producing a voltage at the electrodes of about half the final voltage determined for piercing a hole of desired size. This is done just prior to the application of the regular penetrating voltage, and the pre-ionizing current is generated for the same time interval required for final penetration. From limited tests performed, it is believed that pre-ionization in this manner has little or no effect on the size of the hole produced. It does, however, improve the surface qualities and sharpness of the hole, and while not always essential pre-ionizing has been found to produce more uniform perforations.

What is claimed is:

1. A method of electrically piercing articles of given thickness which comprises placing a workpiece to be pierced between a pair of electrodes, contacting the surface of said workpiece with said electrodes, applying a predetermined mechanical pressure against said workpiece with each of said electrodes, fixing said electrodes relative to said workpiece so that further movement of them toward said workpiece is positively prevented, and discharging an electrical current between said electrodes for a predetermined interval of time through said workpiece in order to form a hole of desired diameter therein.

2. A method as defined in claim 1, wherein one of said electrodes is brought into contact with the workpiece first in order to fix the workpiece in its work-holder and then the other electrode in brought into contact with the opposite side of said workpiece, the pressure applied by said other electrode being no greater than that applied by the first.

3. A method as defined in claim 1, wherein said piercing operation is performed within a liquid of high dielectric strength.

4. A method of electrically piercing contact lenses of polymerized methyl methacrylate having a thickness of from about 0.10 mm. to 0.30 mm. which comprises placing a lens to be pierced between a pair of axially aligned, sharp tipped electrodes, contacting the oposite surfaces of said lens with the tips of said electrodes by applying a predetermined mechanical pressure to the electrodes, fixing said electrodes relative to said workpiece so that further movement of them toward said workpiece is positively prevented, and discharging a high potential electrial current through said electrodes and lens for a predetermined period of time, said high potential discharge being effected at a voltage of from about 3,000 to 25,000 for a period of time from about 0.02 to 0.30 second.

5. A method as defined in claim 4, which comprises applying a voltage of reduced potential to said electrodes prior to applying the full piercing potential thereto.

6. Apparatus for piercing a workpiece of relatively thin cross-section, which comprises a work-holder for positioning said workpiece, a pair of opposed electrodes mounted relative to said work-holder for engagement with opposite faces of a workpiece supported thereon, means for urging said electrodes into engagement with said workpiece with a predetermined force, means for fixing said electrodes and workpiece against movement toward each other, and means for discharging an electrical current from said electrode through said workpiece for a predetermined time-interval in order to perforate said workpiece.

7. Apparatus as defined in claim 6, in which both said electrodes engage said material along a line which is normal to the surface of said material at the point of contact.

8. Apparatus as defined in claim 7, wherein the electrodes are provided with conical work-engaging tips the axes of which coincide, said pressure being applied by both said electrodes along such common axis.

9. Apparatus as defined in claim 6; wherein said electrodes are arranged vertically with respect to each other, said work-holder being adapted to receive said workpiece with its surface to be pierced disposed substantially horizontally so as to support said workpiece from below such that engagement of the upper electrode with said workpiece urges the latter against said work-holder.

10. Apparatus as defined in claim 9, which further includes means associated with said work-holder for submerging said workpiece in a dielectric fluid.

11. Apparatus for perforating electrically nonconductive plastic sheet material and the like having a thickness of the order of 0.01 inch to produce a uniform, smooth-bored aperture of the order of 0.0020 to 0.0040 inch diameter therethrough, which comprises a work-holder for supporting the sheet material to be perforated and means incorporated in said work-holder for maintaining a supply of dielectric fluid on opposite faces of said sheet material; a pair of opposed, sharp tipped electrodes and means supporting said electrodes in centered opposition on opposite sides of said sheet material and adjustable to move said electrodes axially toward and away from the respective sides of said sheet material while maintaining said tips in centered opposition; means incorporated in one of said electrodes to limit to a predetermined pressure the contact of said electrodes against said sheet material as said one electrode is moved axially into contact with said material; other means securing said electrodes in fixed position to prevent further adjustment thereof after said predetermined contact pressure has been established; and means for discharging a high potential electric current through said sheet material between said electrode tips while said electrodes are locked in said predetermined contact pressure condition.

12. Apparatus as defined in claim 11 which includes an electrical control circuit for limiting the discharge voltage and time of discharge of said high potential current.

References Cited by the Examiner

UNITED STATES PATENTS

| | | | |
|---|---|---|---|
| 1,250,140 | 12/1917 | Chapmen | 146—227 |
| 1,493,014 | 5/1924 | Boyle | 120—42.07 |
| 2,011,645 | 8/1935 | Miller | 219—384 |
| 2,113,714 | 4/1938 | Stein | 219—383 X |
| 2,354,871 | 8/1944 | Miller | 219—121 |
| 2,365,576 | 12/1944 | Meaker et al. | 219—384 |
| 2,628,412 | 2/1953 | Vera | 83—16 X |
| 3,009,561 | 11/1961 | Schoolcraft et al. | 198—33 |
| 3,020,377 | 2/1962 | Shawfrank | 219—384 |
| 3,057,075 | 10/1962 | Lippke | 162—192 X |

FOREIGN PATENTS

| | | |
|---|---|---|
| 952,937 | 11/1956 | Germany. |
| 637,793 | 5/1950 | Great Britain. |

OTHER REFERENCES

German application F 16,502 VIII d/21h, February 23, 1956.

RICHARD M. WOOD, *Primary Examiner.*